United States Patent
Kaneiwa

(10) Patent No.: US 8,022,592 B2
(45) Date of Patent: Sep. 20, 2011

(54) COIL FIXING MEMBER AND ROTARY ELECTRIC MACHINE

(75) Inventor: Hiroshi Kaneiwa, Chiryu (JP)

(73) Assignee: Denso Corporation, Kariya (JP)

( * ) Notice: Subject to any disclaimer, the term of this patent is extended or adjusted under 35 U.S.C. 154(b) by 266 days.

(21) Appl. No.: 12/392,252

(22) Filed: Feb. 25, 2009

(65) Prior Publication Data
US 2009/0212654 A1 Aug. 27, 2009

(30) Foreign Application Priority Data
Feb. 27, 2008 (JP) ................................ 2008-045997

(51) Int. Cl.
*H02K 3/46* (2006.01)
(52) U.S. Cl. ....................................... 310/260; 310/214
(58) Field of Classification Search ............... 310/71, 310/260, 214, 216.115, 216.127, 216.128
See application file for complete search history.

(56) References Cited

U.S. PATENT DOCUMENTS

| | | | | |
|---|---|---|---|---|
| 3,414,746 A | * | 12/1968 | Melvin .................. | 310/216.132 |
| 4,484,096 A | * | 11/1984 | Sauerwein et al. ............ | 310/260 |
| 4,841,186 A | * | 6/1989 | Feigel et al. .............. | 310/156.12 |
| 5,081,382 A | * | 1/1992 | Collings et al. ................. | 310/54 |

FOREIGN PATENT DOCUMENTS

| | | |
|---|---|---|
| JP | 62-044040 | 2/1987 |
| JP | 04-111259 | 9/1992 |
| JP | 2000-166158 | 6/2000 |
| JP | 2006-033918 | 2/2006 |
| JP | 2007-312549 | 11/2007 |

OTHER PUBLICATIONS

Japanese Office Action dated Jan. 12, 2010, issued in corresponding Japanese Application No. 2008-045997, with English translation.

* cited by examiner

*Primary Examiner* — Dang D Le
(74) *Attorney, Agent, or Firm* — Nixon & Vanderhye PC

(57) ABSTRACT

Each coil fixing member is placed between a stator coil and at least one end surface of a stator core in an electric rotary machine in order to suppress a displacement between the stator core and the stator coil. The coil fixing member consists of a spacer and a bolt. The bolt and a corresponding screw hole formed on an end surface of the stator core are used to fix the stator core in the electric rotary machine. The spacer consists of a main body part and a bolt fixing part. The bolt fixing part has a bolt hole. The main body part has a tapered shape. The main body part is placed between the end surface of the stator core and connection parts of windings of the stator coil, and fixed to the stator core by the bolt through the bolt hole of the bolt fixing part.

20 Claims, 9 Drawing Sheets

COIL FIXING MEMBER AND ROTARY ELECTRIC MACHINE

CROSS-REFERENCE TO RELATED APPLICATION

This application is related to and claims priority from Japanese Patent Application No. 2008-045997 filed on Feb. 27, 2008, the contents of which are hereby incorporated by reference.

BACKGROUND OF THE INVENTION

1. Field of the Invention

The present invention relates to coil fixing members capable of avoiding a displacement between a stator core and a stator coil in an electric rotary machine, and an electric rotary machine having the stator core, the stator coil, and one or more coil fixing members assembled between the stator core and the stator coil.

2. Description of the Related Art

Recently, there is a strong demand to provide electric rotary machines such as electric motors and alternators with an improved quality, a high power, and a small size. For example, the electric rotary machine with a high power is assembled in the engine compartment that has a reduced area in a vehicle. Thus, there is the demand to improve the reliability of the electric rotary machine.

Japanese patent laid open publication No. JP 2000-166158 has disclosed a conventional technique of the electric rotary machine equipped with insulation spacers. Those insulation spacers are placed between the stator core and the stator coil of the electric rotary machine. However, those insulation spacers are only placed between them in the electric rotary machine without being supported by the stator core and the stator coil. This conventional structure of the electric rotary machine causes a displacement of the insulation spacers between the stator core and the stator coil. The insulation spacers finally fall away from the stator core by vibration, thermal stress, or mechanical stress caused when the electric rotary machine is rotating.

Falling away of or automatically releasing the insulation spacers from the stator core causes electrical contact between the stator core and the stator coil. This causes the deterioration of the insulation performance of a stator winding wound on the stator core. The deterioration of the stator winding and the stress by the vibration causes damage to the stator winding. As a result, this reduces the reliability of the electric rotary machine.

SUMMARY OF THE INVENTION

It is an object of the present invention to provide coil fixing members, and an electric rotary machine with the coil fixing members. In particular, each coil fixing member, to be placed between the stator coil and the stator core of the electric rotary machine, is hard to slip and fall away from the stator core.

To achieve the above purposes, the present invention provides coil fixing members to be placed between a stator coil and at least one end surface of a stator core in an electric rotary machine. The electric rotary machine has a rotor with a plurality of magnetic north and south poles alternately placed along the circumferential direction thereof. One or more coil fixing members, most preferably, at least three coil fixing members are assembled between the stator coil and the stator core in the electric rotary machine. Each coil fixing member suppresses a displacement between the stator core and the stator coil and fixes them together. The stator core has a plurality of slots that are formed along the circumferential direction of the stator core. The depth direction of each slot is equal to the diameter direction of the stator core. The slots face together at the inside or the outside. The stator coil has stator windings. Each stator winding has connection parts. Each connection part connects the stator windings in slot accommodation parts together at the outside of the slots. The slot accommodation parts are placed in different slots in the circumferential direction of the stator core. Each coil fixing member has a main body part to be placed between the connection parts of the stator windings and the end surface of the stator core in order to suppress the displacement between the stator coil and the stator core. A displacement preventing member is capable of preventing the displacement of the main body part placed between the stator core and the stator coil.

The coil fixing member according to the present invention has the main body part and the displacement preventing member. The main body part is inserted and placed between the end surface of the stator core and the connection parts of the stator windings of the stator coil in order to prevent the displacement between the stator core and the stator coil. The displacement preventing member prevents the main body part from sliding on the end surface of the stator core. That is, the main body part of the coil fixing member prevents the stator coil and the stator core from sliding together, and the displacement preventing member prevents the main body part from sliding or moving on the end surface of the stator corer. This structure prevents falling away of the coil fixing members from the stator core even if vibration, heat energy, and mechanical stress are applied to the electric rotary machine. As a result, assembling the coil fixing members into the electric rotary machine can suppress the performance of the electric rotary machine from decreasing.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
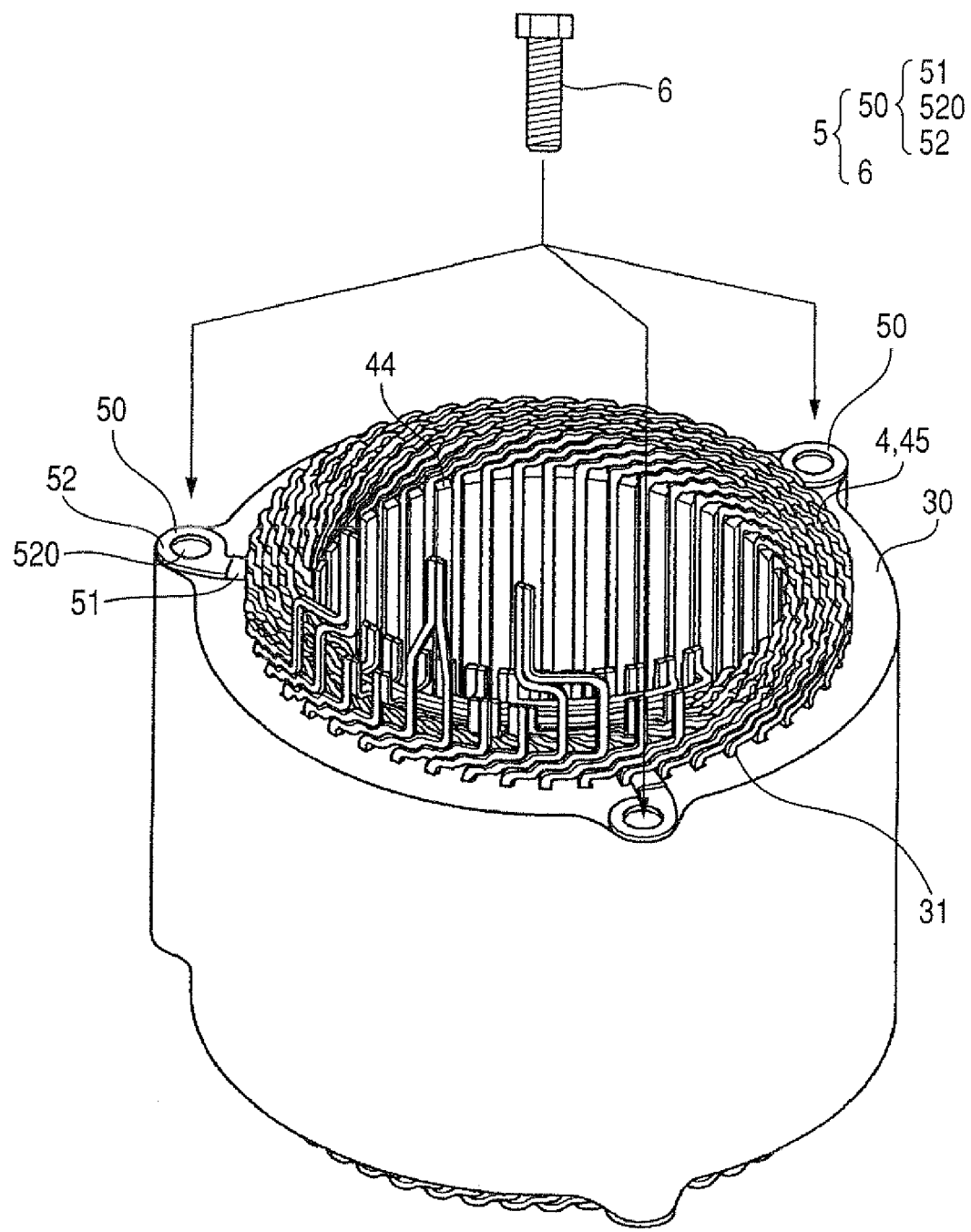
FIG. 1 is a view showing the coil fixing members assembled between the stator coil and the stator core in an electric rotary machine according to the first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the coil fixing members capable of fixing the stator coil and the stator core in the electrical rotary machine according to the first embodiment of the present invention with reference to FIG. 1 to FIG. 7.

Figure 2:
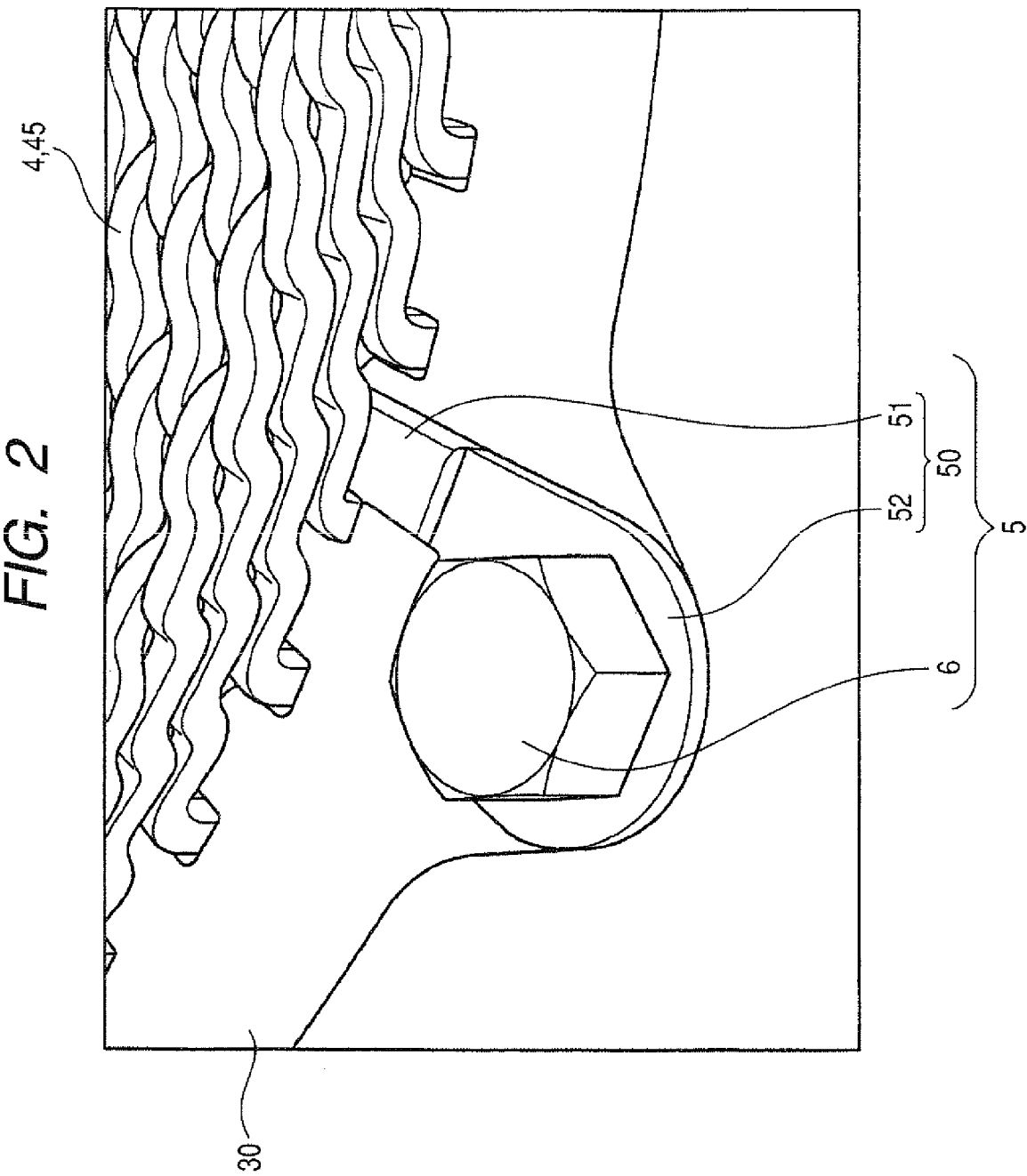
FIG. 2 is an enlarged view of the coil fixing member to be assembled into the stator coil and the stator core of the electric rotary machine according to the first embodiment of the present invention.

FIG. 1 is a view showing the coil fixing members 5 assembled between the stator coil 4 and the stator core 30 in the electric rotary machine 1 according to the first embodiment. FIG. 2 is an enlarged view of the coil fixing member 5 to be assembled between the stator coil 4 and the stator core 3 of the electric rotary machine 1 according to the first embodiment of the present invention.

As shown in FIG. 1 and FIG. 2, the coil fixing member 5 is assembled between the stator core 30 and the stator coil 4 in the electrical rotary machine 1. The coil fixing members 5 is composed of a spacer 50 and a bolt 6. The spacer 50 is composed of a main body part 51 and a bolt fixing part (a displacement preventing member) 52.

Figure 3:
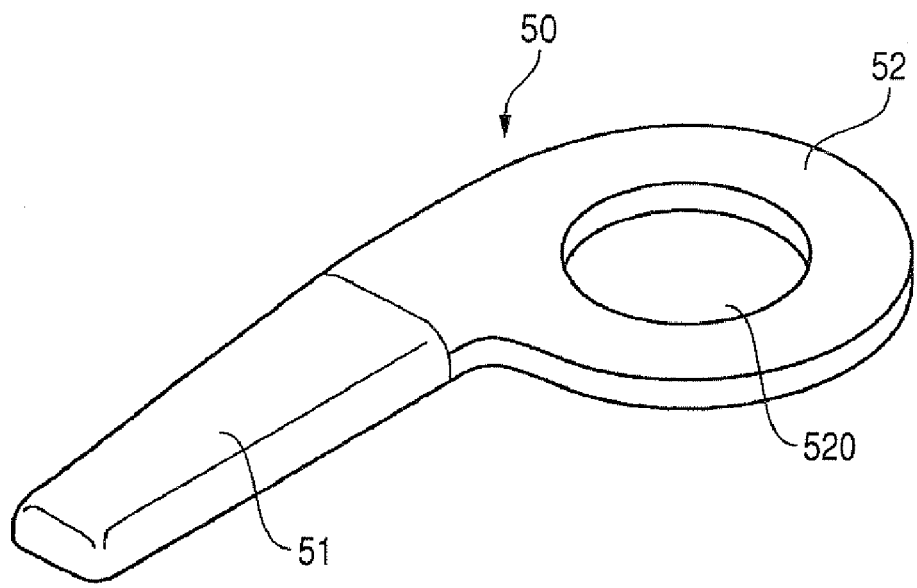
FIG. 3 is an enlarged perspective view of the spacer in the coil fixing member according to the first embodiment of the present invention.

FIG. 3 is an enlarged perspective view of the spacer 50 in the coil fixing member 5 according to the first embodiment of the present invention. As shown in FIG. 3, the spacer 50 has the main body part 51 and the bolt fixing part 52 (the displacement preventing member) extending from the main body part 51 in the diameter direction of the main body part 50. The main body part 51 and the bolt fixing part 52 are assembled together. The electric rotary machine 1 according to the first embodiment has the stator core 30 and the stator coil 4 to which the three coil fixing members 5 are assembled.

Figure 4:
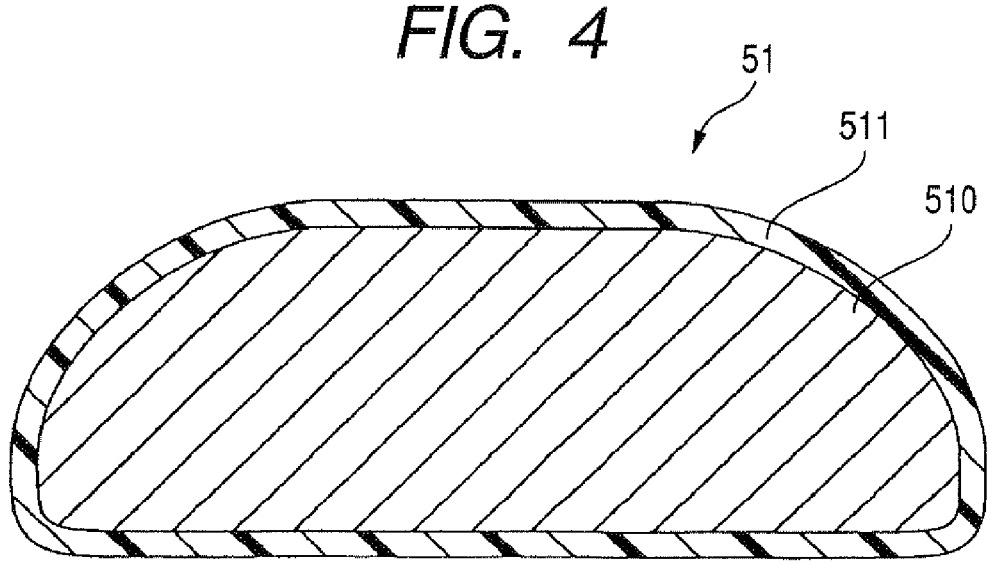
FIG. 4 is a cross section of the main body part of the spacer shown in FIG. 3.

FIG. 4 is a cross section of the main body part 51 of the spacer 50 shown in FIG. 3. As shown in FIG. 4, the main body part 51 is composed of the metal plate 510 and the resin film 511 formed on the outer surface of the metal plate 510. The main body part 51 is inserted and placed between the stator coil 4 and the stator core 30 so that the surface of each corner of the main body part 51, which is the opposite side to the stator core 30, has a smoothly tapered and rounded shape.

The bolt fixing part 52 has a bolt hole 520 formed on the metal plate that is assembled with the metal plate 510 of the main body part 51. The bolt hole 520 of the bolt fixing part 52 is formed so that a screw hole formed on the stator core 30 corresponds in position to the bolt hole 520 when the main body part 51 of the spacer 50 is inserted and placed between the stator core 30 and the stator coil 4. This screw hole formed on the stator core 30 is also used for fixing the stator core 30 to the electric rotary machine 1.

Through the bolt hole 520 the bolt 6 is engaged with the screw hole formed on the stator core 30. The screw hole is only formed on the end surface of the stator core 30. It is possible to use the pre-formed screw hole or to newly form the screw hole in the stator core 30. The first embodiment uses the screw holes for fixing the stator core 30 to the housing 10 of the electric rotary machine 1.

It is possible to assemble the coil fixing member 5 according to the first embodiment to the stator core 30 by inserting the spacer 50 between the stator core 30 and the assembled stator coil 4 toward the diameter direction of the stator core 30 from the outside to the inside of the stator core 30. The coil fixing member 5 is finally fixed onto the end surface of the stator core 30 by the bolt 6 through the bolt fixing part 52.

The spacer 50 forming the coil fixing member 5 can effectively maintain the assembled state of the stator coil 4 and the stator core 30 because the main body part 51 of the spacer 50 is substantially made of the metal plate 510, and the spacer 50 prevents the main body part 51 from deforming even if the stator coil 4 slides on the end surface of the stator core 30 toward the axial direction thereof.

The main body part 51 having a tapered shape can be smoothly inserted and assembled between the stator coil 4 and the stator core 30 without interfering with the stator coil 4.

A description will now be given of the electric rotary machine 1 having the stator coil 4 and the stator core 30 to which the coil fixing members 5 are assembled.

Figure 5:
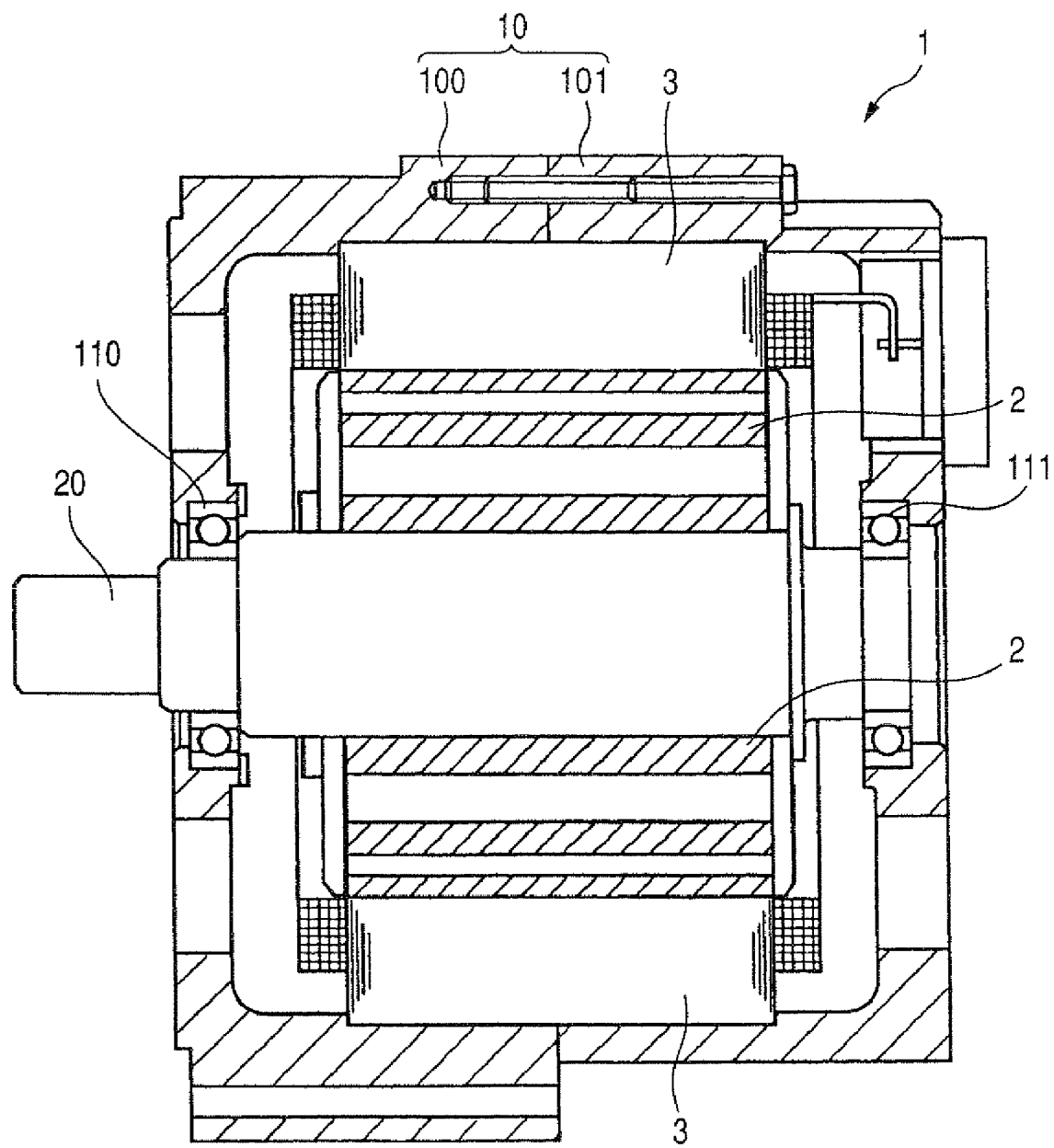
FIG. 5 is a cross section of the electric rotary machine with the coil fixing member according to the first embodiment of the present invention.

FIG. 5 is a cross section of the electric rotary machine 1 having the stator core 30 and the stator coil 4 to which the coil fixing members according to the first embodiment are assembled.

As shown in FIG. 5, the electric rotary machine 1 is comprised of the housing 10, the rotor 2, and the stator 3. The housing 10 has a pair of housing members 100 and 101 of a cylindrical shape having one bottom base. The housing members 100 and 101 are joined together through opening parts thereof and tightly fixed to each other. The rotor 2 is fixed to the rotary shaft 20 that is supported by the housing 10 through bearings 110 and 111. The stator 3 is fixed to the housing 10 at the position of the rotor 2 accommodated by the housing 10.

The rotor 2 has a plurality of permanent magnets which are alternately placed along the outer periphery of the rotor 2 in its circumferential direction in order to form different magnetic poles, north (N) pole and south (S) pole. Those magnetic poles face the inner circumferential side of the stator 3. However, the number of the magnetic poles of the rotor 2 is not limited because the electric rotary machines have different number of the magnetic poles according to applications. The structure of each embodiment according to the present invention shown in FIG. 1 to FIG. 11 has the stator of eight magnetic poles (four N poles and four S poles).

The stator 3 has the stator core 30, the three phase coil 4 composed of phase windings, and insulating sheets (not shown) placed between the stator core 30 and the stator coil 4.

The stator core 30 has a circular ring shape in which a plurality of slots 31 (see FIG. 1) is formed along the inner circumference thereof. each slot 31 is formed so that its depth direction is equal to its diameter direction of the stator core 30. The number of the slots 31 formed in the stator core 30 is two per each phase of the coil 4. That is, the total number of the slots 31 is forty eight (8 poles×3 phases×2=48).

The stator core 30 has a predetermined number of divided cores placed along the circumferential direction thereof. In the structure of the electric rotary machine according to the first embodiment, its number is twenty four. Each divided core divides one slot 31. That is, the adjacent divided cores observed along the circumferential direction of the stator core 30 forms one slot 31. Each divided core is composed of a teeth part extending toward the inner diameter direction and a back core part where the teeth part is formed.

The stator core 30 is made of four hundred and ten magnetic steel sheets which are laminated. Each magnetic steel sheet has 0.3 mm thickness. The insulation thin film is formed between the adjacent magnetic steel sheets which are laminated. It is also possible to form the stator core 30 using available metal thin-plates and insulation films instead of the above laminated magnetic steel sheets.

Figure 6A:
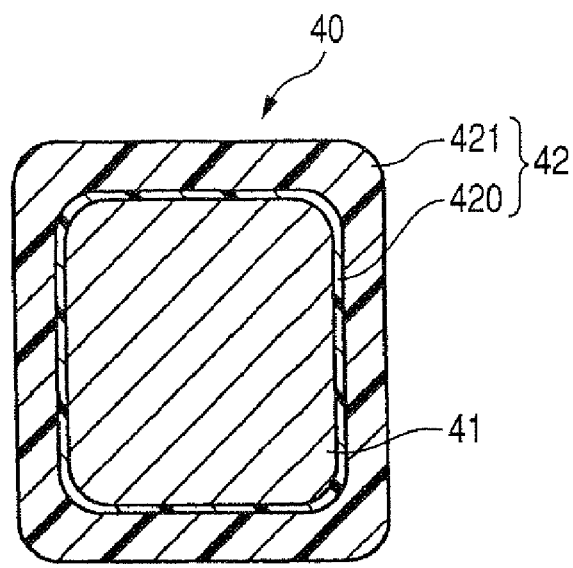
FIG. 6A and FIG. 6B each shows a cross section of each phase winding that forms the stator coil of the electric rotary machine according to the first embodiment of the present invention.
Figure 6B:
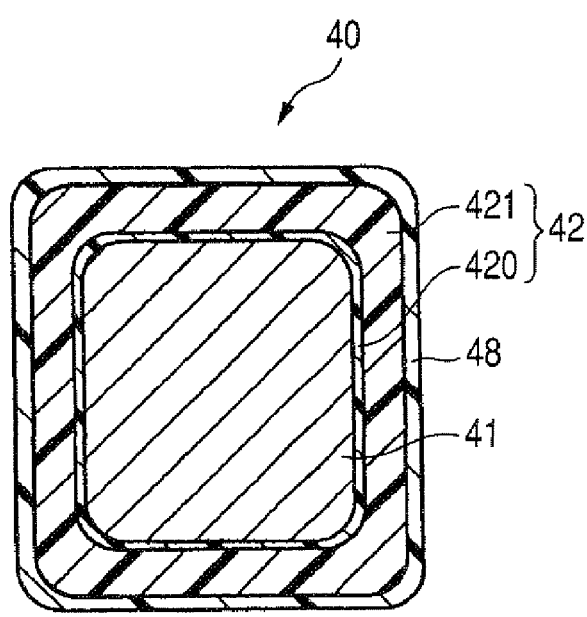

FIG. 6A and FIG. 6B each shows a cross section of each phase winding that forms the stator coil 4 of the electric rotary machine 1 according to the first embodiment of the present invention;

The stator coil 4 is formed by winding a plurality of windings 40 in a predetermined direction. As shown in FIG. 6A, each winding 40 forming the stator coil 4 is composed of a conductor 41 made of copper and an insulation film 42. The insulation film 42 is composed of an inner layer 420 and an outer layer 421. The outer periphery of the conductor 41 is covered with the inner layer 420. Thus, the inner layer 420 insulates the conductor 41 from the outer layer 421.

The total thickness of the insulation film 42 composed of the inner layer 420 and the outer layer 421 has a thickness within a range of 100 μm to 200 μm.

Because the insulation film 42 composed of the inner layer 420 and the outer layer 421 is thick, it is not necessary to insulate the winding 40 from the adjacent winding 40 by an insulator such as an insulation paper between the adjacent windings 40. However, it is possible to use the insulation paper between the adjacent windings 40 or between the stator core 30 and the windings 40.

The outer layer 421 is made of insulator such as thermoplastic resin or polyamideimide having a higher glass transition temperature rather than that of the outer layer 421. Using the above outer layer 421 causes faster softening of the outer layer 421 rather than the inner layer 420 by heat energy generated in the electric rotary machine 1. The heat energy from the electric rotary machine 1 melts the outer layers 421 of the windings 40 placed in the same slot 31 and the outer layers 421 of the windings 40 in the same slot 31 thermally adhere together. The melted outer layers 421 make the single rigid wire composed of the assembled windings 40. As a result, because this increases the mechanical strength of the windings 40 placed in each slot 31, and because the outer layer 421 is firstly separated from the inner layer 420 rather than that the inner layer 420 is separated from the conductor 41 by excess vibration, it is possible to maintain the adhesion force between the inner layer 420 and the conductor 41 in each winding 40, and to maintain the electrical insulation between the conductor 41.

Still further, as shown in FIG. 6A and FIG. 6B, it is possible to cover the outer periphery of the insulation film 42 composed of the inner layer 420 and the outer layer 421 with melting material 43 such as epoxy resin.

Because this structure melts the melting material 43 by heat energy generated in the electric rotary machine 1 faster than the insulation film 42, the plurality of windings 40 placed in the same slot 31 is melted and adhered to each other. This makes the single rigid wire composed of the assembled windings 40. As a result, because this increases the mechanical strength of the windings 40 placed in each slot 31.

Still further, it is possible to use the insulation film 42 made of polyphenylenesulfide (PPS) for the windings 40 forming the stator coil 4.

Figure 7:
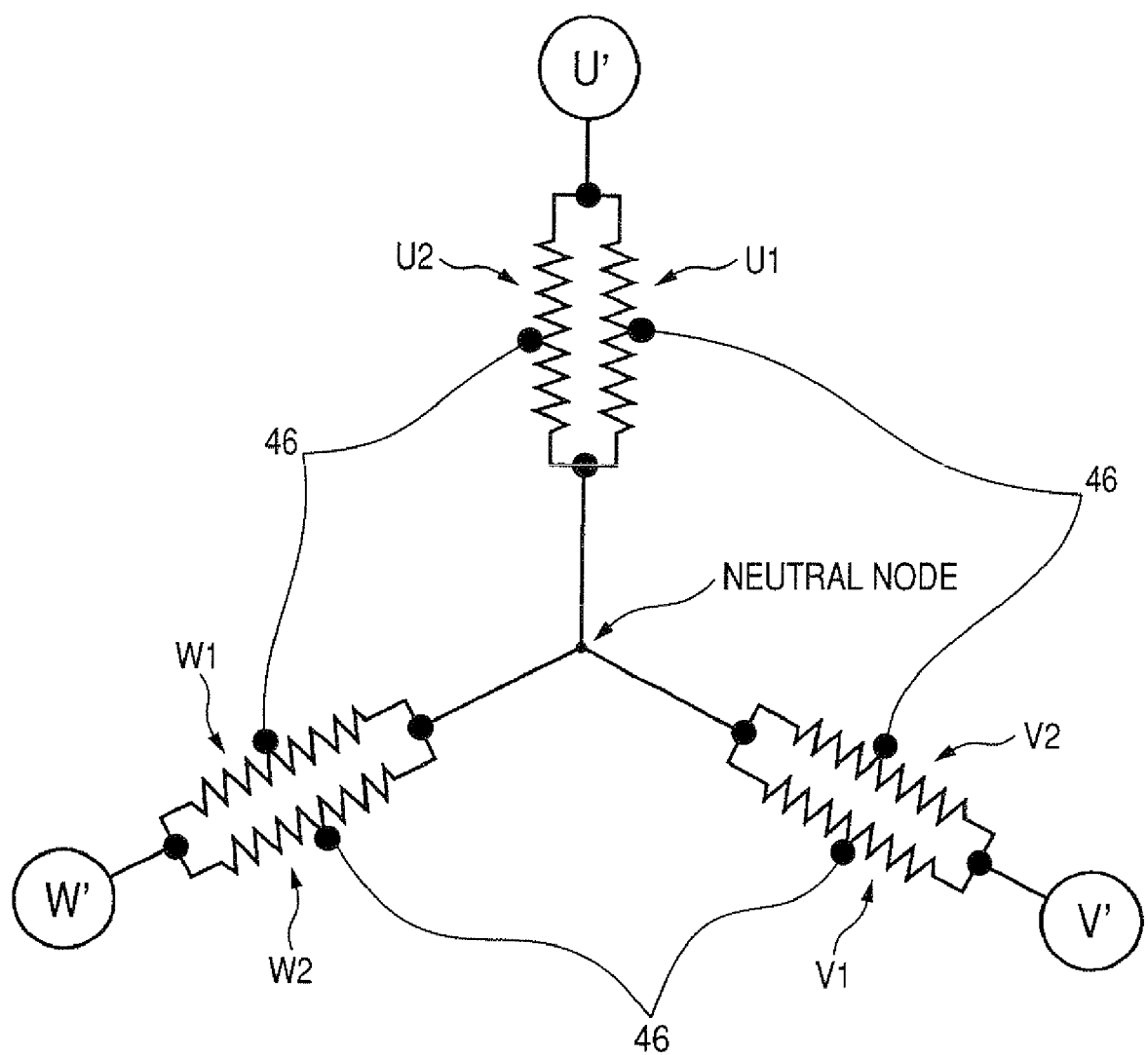
FIG. 7 is a view showing a star connection (Y-connection) of three is phase (U, V, and W phases) windings in the electric rotary machine according to the first embodiment of the present invention.

FIG. 7 is a view showing a star connection (Y-connection) of the three phase (U, V, and W phases) windings in the electric rotary machine 1 according to the first embodiment of the present invention.

As shown in FIG. 4, the stator coil 4 consists of the three phase windings. Each phase winding is composed of two components such as U1 and U2, V1 and V2, and W1 and W2.

The stator coil 4 consists of the plurality of windings 40 wound in a predetermined loop shape. The windings 40 forming the stator coil 4 are wound at the inner periphery of the stator core 30 along the circumferential direction. The stator core 4 has slot accommodation parts 44 and connection parts 45. Each slot accommodation part 44 has a straight shape and is placed in the slot 31 formed in the stator core 30. Each connection part 45 connects the adjacent slot accommodation parts 44 together.

Each slot accommodation part 44 is accommodated in the slot 31 every predetermined slot number. In the structure of the first embodiment, the predetermined slot number is six (three phases Xtwo =six).

Each connection part 45 is projected from the end surface of the stator core 30 in the axial direction of the electric rotary machine 1.

As shown in FIG. 1, the stator coil 4 consists of the plurality of windings 40 formed along the circumferential direction of the stator core 30 so that one end of each winding 40 projects from the end surface of the stator core 30 and has a wave form.

The windings 40 of the stator coil 4 are wound from the outside toward the inside direction of the diameter of the stator core 30.

The end part of each winding 40 projects at the inner circumferential surface from the end surface of the stator coil 4.

The winding method of winding up the windings 40 of the stator coil 4 is specifically limited.

It is possible to make one phase of the stator coil 4 using two windings 40 which are wound in different direction and have a wave form along the circumferential direction of the stator core 30, and which are connected together at the returning point 46 shown in FIG. 1.

That is, it is acceptable for the winding 40 to consist of the primary winding 40 and the secondary winding 40 electrically connected together. Both the slot accommodation parts 44 for the primary and secondary windings are accommodated in the same slot 31. The slot accommodation part 44 for the primary winding 40 and the slot accommodation part 44 for the secondary winding 40 are alternately placed in the depth direction of the slot 31. Because this structure avoids the end part of the winding 40 at the inmost periphery side of the stator coil 4, and the end part of each winding 40 is not thereby over the end surface of the stator coil 4, it is possible to reduce the entire size of the stator coil 4.

The end parts of the primary and secondary windings 40 at the inmost periphery side in the stator coil 4 are electrically connected so that both the primary and secondary windings 40 form one phase. The six pairs of the primary and secondary windings 40 form the stator coil 4 of the three phase (U, V, and W)×two slots. That is, the stator coil 4 uses two windings 40 (primary and secondary windings 40)×three phases (U, V, and W)×two (slots)=12 (windings in total).

In the first embodiment of the present invention, the winding 40 is wound four-times to form the stator coil 4. That is, the stator coil 4 has the four layer structure in the circumferential direction. In other words, the eight slot accommodation parts 44 are placed in one slot 31.

The connection parts 45 of the windings 40 are placed at both sides of the stator core 30 in the axial direction. It is so formed that a central part of the connection part 45 has a crank shape without twisting.

The connection part 45 has a crank shape observed along the circumferential direction of the stator core 30. The shift amount of the connection part 45 having the crank shape is approximately equal to a width of the winding 40. Because this structure avoids any interference between the connection parts 45 of the adjacent windings 40 in the diameter direction of the stator core 3, it is possible to closely wind up the connection parts 45 in the stator coil 4.

As a result, because the width of the coil end projected from the end surface of the stator core 30 is reduced, it is possible to avoid the winding 40 forming the stator coil 4 extending toward the outside in the diameter direction of the stator core 30.

The connection part 45 projected from the slot 31 toward the outside of the stator core 30 has a step shape from the end surface of the stator core 30 toward the axial direction of the stator core 30. Having the step shape of the connection part 45 avoids the interference to the winding 40 projecting from the slot which is adjacent to the connection part 45 along the circumferential direction. This structure prevents the height of the coil end projecting from the end surface of the stator core 30 or the width of the coil end in the diameter direction becoming large in order to eliminate interference between windings together projecting from the slots adjacent along the circumferential direction. As a result, because the height of the coil ends of the stator coil 4 can be decreased, and the width of the coil end of the stator coil 4 in the diameter direction of the stator core 30 becomes small, it is possible to prevent the stator coil 4 from projecting toward the diameter direction of the stator core 30.

The connection part 45 has the four step shape, and the height of one step of the connection part 45 is approximately equal to the width (or height) of the winding 40. It is thereby possible to overlap the connection parts 45 without any gap when the connection parts 45 are laminated in the axial direction of the stator core 30. This structure of the connection parts 45 allows the connection parts 45 to be closely wound.

The top part (or the highest part) of the step-shaped connection part 45 has a crank-shaped part. Therefore both sides of the connection part 45 of the winding 40 have the step shape toward both sides observed from the crank-shaped part.

There is a gap between the bottom part of the connection part 45 of a step shape and the end surface of the stator core 30. The bottom part of the connection part 45 is a part extending approximately in parallel along the end surface of the stator core 30. The gap relaxes the stress applied to the stator windings 40 when the windings 40 are processed, the stator coil 4 and the stator core 30 are assembled. The presence of the gap also prevents deterioration of the insulation function, and also the stator core 30 from being deformed.

In the stator coil 4, the connection parts 45 project within the height of the coil end projected from the stator core 30, and the end part of the assembled body of each winding 40 forming the stator coil 4 projects toward the outside of the diameter direction of the stator core 30.

As shown in FIG. 1, the end part of the assembled body of each phase winding 40, namely, the end part of the neutral node of the stator coil 4 projects toward the outside in the diameter direction rather than the end part of the other windings.

In the first embodiment, the main body part 51 of the spacer 50 of the coil fixing member 5 is inserted and placed between the stator core 30 and the bottom part of the connection parts 45 of the stepped shape. The presence of the main body part 51 suppresses both the lowest part of the connection parts 45 having the stepped shape and the stator core 30 slipping in the axial direction of the stator core 30.

The spacer 50 of the coil fixing member 5 is fixed to the stator core 30 by the bolt 6 shown in FIG. 1. As a result, using the bolt 6 suppresses the spacer 50 itself from slipping in addition to suppressing the stator coil 4 and the stator core 30 from slipping.

As described above in detail, the structure of the electric rotary machine 1 according to the first embodiment prevents the spacer 50 from sliding in addition to preventing the stator coil 4 and the stator core 30 from sliding to each other. As a result, this function suppresses the spacer 50 from falling away from the stator core 30.

In the structure of the electric rotary machine 1 according to the first embodiment, the three spacers 50 are fixed to the stator core 30 in the circumferential direction of the stator core 30. However, the number of the coil fixing members 5 is not limited. It is acceptable to fix the coil fixing members 5 at not less than a pair of symmetric positions along the circumferential direction of the stator core 30 in the electric rotary machine 1. The most preferable number thereof is three.

Still further, it is sufficient to fix the coil fixing members 5 onto at least one end surface of the stator core 30. It is more preferable to fix the coil fixing members 5 onto both the end surface of the stator core 30 in the electric rotary machine 1.

Second Embodiment

A description will be given of the coil fixing members 5-1 assembled in the stator core and the stator coil in the electric rotary machine 1 according to the second embodiment of the present invention with reference to FIG. 8 and FIG. 9.

Figure 8:
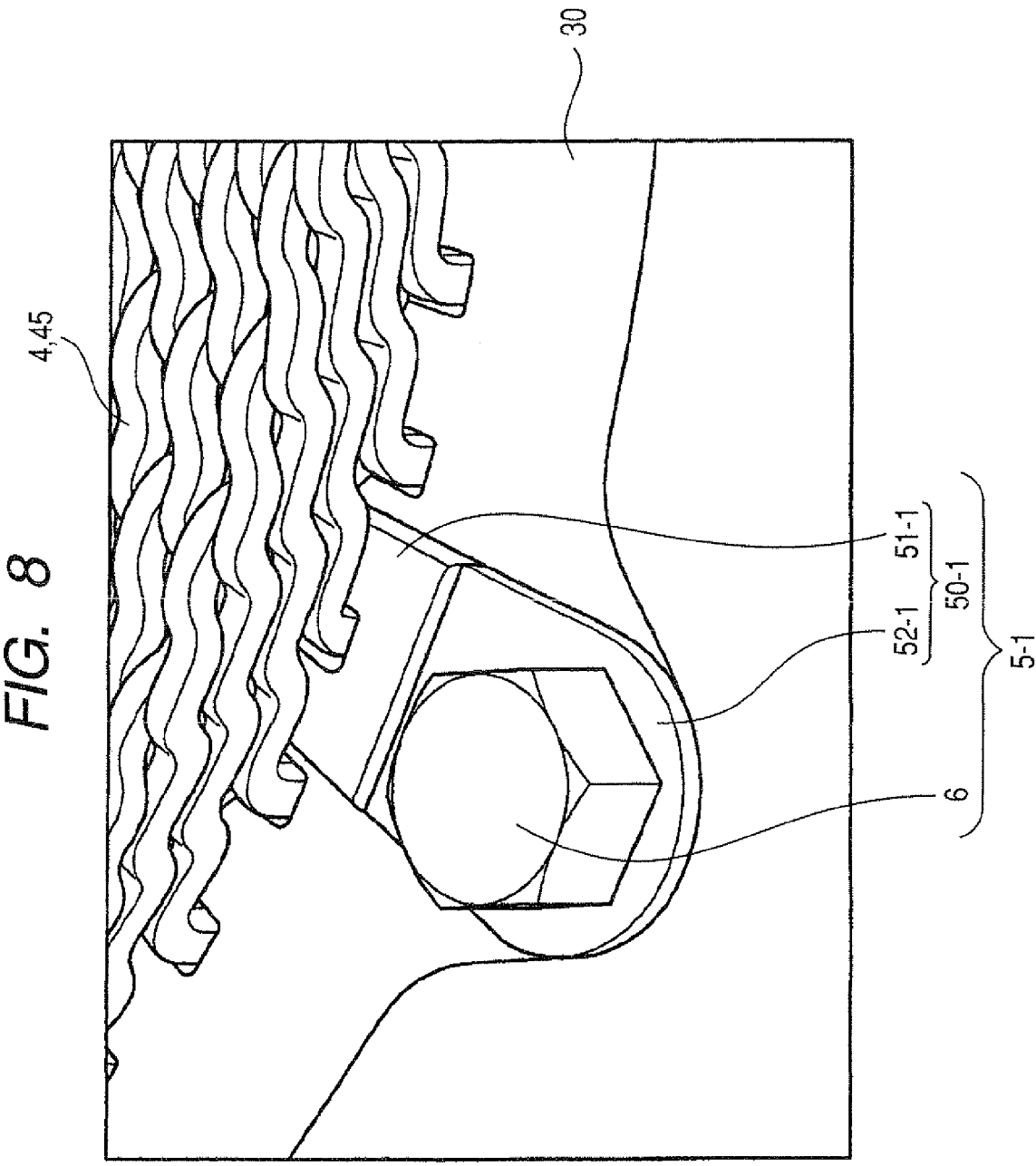
FIG. 8 is a view showing the coil fixing member assembled into the stator core and the stator coil in the electric rotary machine according to the second embodiment of the present invention.

FIG. 8 is a view showing the coil fixing member 5-1 assembled between the stator core and the stator coil in the electric rotary machine according to the second embodiment. FIG. 9 is an enlarged perspective view of the coil fixing member 5-1 according to the second embodiment shown in FIG. 8.

The spacer 50-1 in each coil fixing member 5-1 according to the second embodiment has a different shape from that of the spacer 50 on the coil fixing member 5 according to the first embodiment. Other components of the coil fixing member 5-1 according to the second embodiment shown in FIG. 9 have the same shape as those of the coil fixing members 5 according to the first embodiment shown in FIG. 3. The electric rotary machine, into which the coil fixing members 5-1 according to the second embodiment are assembled, has the same structure as the electric rotary machine according to the first embodiment. Therefore the explanation for the same components is omitted here.

Figure 9:
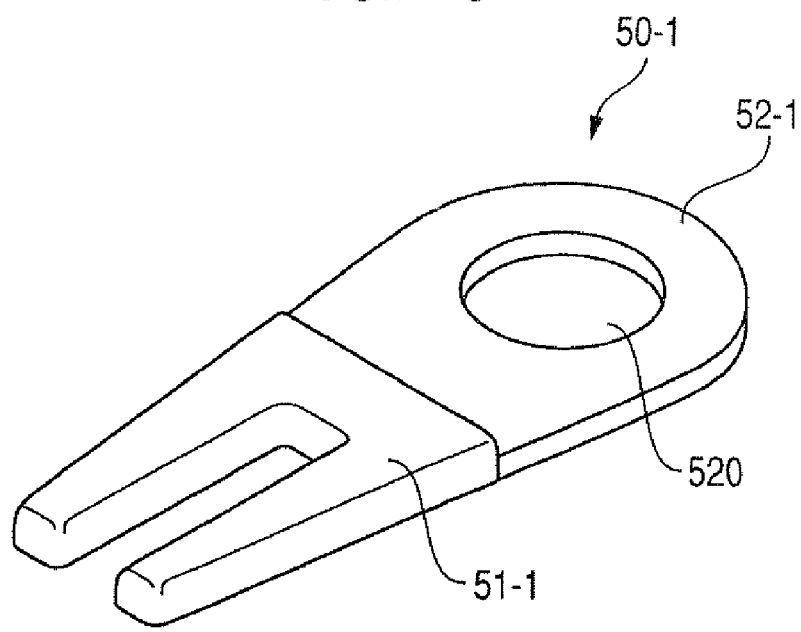
FIG. 9 is an enlarged perspective view of the coil fixing member according to the second embodiment of the present invention.

As shown in FIG. 9, each coil fixing member 5-1 according to the second embodiment has the main body part 51-1 having a concave part of a character "U" shape. Thus, the main body part 51-1 accommodates one slot 31 therein.

The coil fixing member 5-1 according to the second embodiment has the same effect of the coil fixing member 5 according to the first embodiment. The coil fixing member 5-1 according to the second embodiment fixes the stator coil 4 and the stator core 30 at both the sides of the connection part 45 of the winding 40, observed along the circumferential direction of the stator core 30. Each slot 31 corresponds in position to the main body part 51-1 of the spacer 50. This structure more prevents the stator coil 4 from sliding to the stator core 30.

Third Embodiment

A description will be given of the coil fixing members 5-2 to be assembled between the stator core and the stator coil in the electric rotary machine 1 according to the third embodiment of the present invention with reference to FIG. 10 and FIG. 11.

Figure 10:
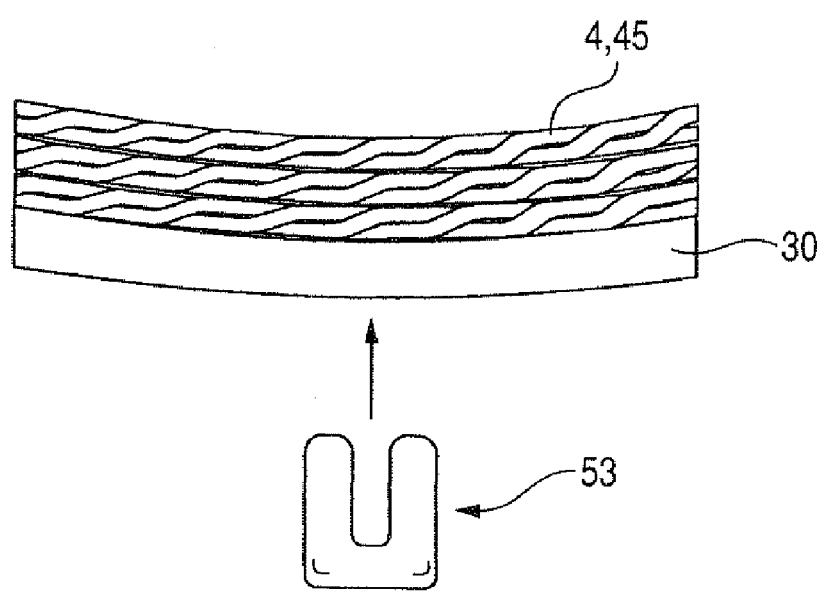
FIG. 10 is a perspective view of the coil fixing member to be assembled between the stator core and the stator coil in the electric rotary machine according to the third embodiment of the present invention.

FIG. 10 is a perspective view of the coil fixing member 5-2 to be assembled between the stator core 30 and the stator coil 4 in the electric rotary machine 1 according to the third embodiment. FIG. 11 is a perspective view of the coil fixing member 5-2 assembled between the stator core 30 and the stator coil 4 in the electric rotary machine 1.

Figure 11:
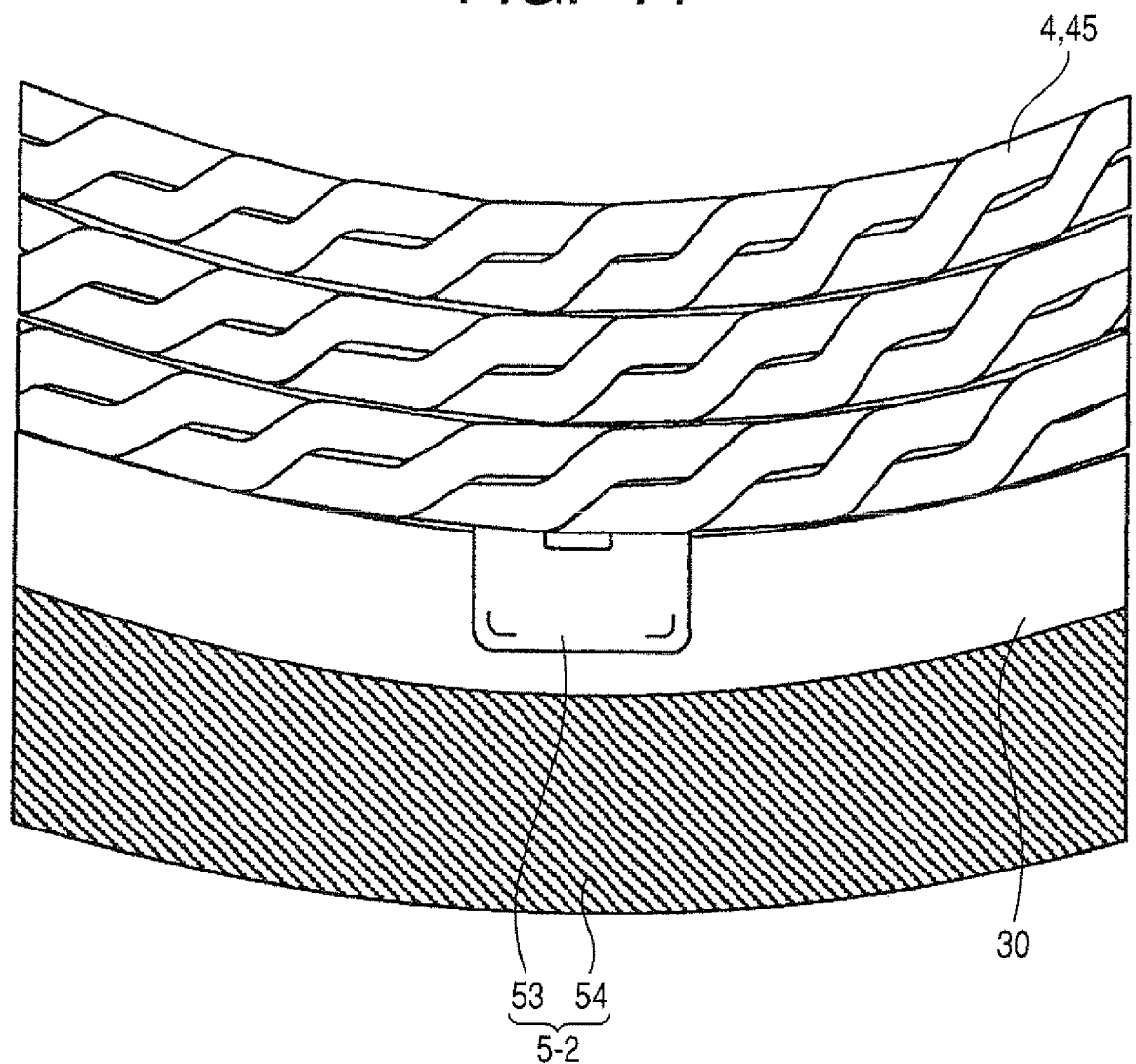
FIG. 11 is a perspective view of the coil fixing member assembled between the stator core and the stator coil in the electric rotary machine according to the third embodiment of the present invention.

As shown in FIG. 10 and FIG. 11, the coil fixing members 5-2 according to the third embodiment consist of a spacer 53 of a character "U" shape and a ring member 54. The spacer 53 has a plate of the character "U" shape. Similar to the main body part 51 of the spacer 50 according to the first embodiment shown in FIG. 3, the outer periphery of the spacer 53 made of metal plate is covered with resin film. The spacer 53 is inserted between the stator core 30 and the stator coil 4 from the outside of the diameter direction of the stator core 30 toward the inside thereof. The corner parts of the surface of the spacer 53, at the opposite side observed from the stator core 30, has a smooth tapered-shape. The spacer 53 is placed between the stator core 30 and the stator coil 4.

The ring member 54 in the coil fixing members 5-2 according to the third embodiment is contacted to the outer circumferential surface of the stator core 30 shown in FIG. 11. The ring member 54 has a projection part which is projected from the end surface of the stator core 30 when it is assembled to the stator core 30.

It is sufficient for the ring member 54 to be a ring shaped member contacted to the entire of the outer periphery of the stator core 30. For example, it is possible to use a housing to accommodate the stator core 30 as the ring member 54. The ring member 54 prevents the spacer 53 from sliding toward the outside of the diameter direction of the stator core 30.

The electric rotary machine, to which the coil fixing member 5-2 according to the third embodiment, has the same structure of the electric rotary machine according to the first embodiment.

In the structure of the coil fixing member 5-2 of the third embodiment, the spacer 53 is placed between the stator core 30 and the most bottom part of the connection part 45 having a stepped shape. The spacer 53 prevents the most bottom part of the connection part 45 and the stator core 30 from slipping toward the axial direction of the stator core 30. Further, the ring member 54 prevents the spacer 53 from sliding toward the radial direction of the stator core 30. That is, the spacer 53 prevents the stator coil 4 and the stator core 30 from slipping to each other toward the axial direction, and the ring member prevents the spacer 53 from slipping toward the radial direction.

As described above, the present invention provides the electric rotary machine 1 in which the spacer 53 prevents the stator coil 4 and the stator core 30 from slipping toward the axial direction, and the ring member 54 prevents the spacer 53 from slipping toward the diameter direction. As a result, it is possible to provide the electric rotary machine having the function to avoid the deterioration caused by falling away of the spacer 53 from the stator core 30.

(Other Features and Effects of the Present Invention)

In the coil fixing member as another aspect of the present invention, the displacement preventing member in each coil fixing member has a bolt fixing part and a bolt. The bolt fixing part has a bolt hole that is assembled together with the main body part, and through which a bolt is inserted. The coil fixing member is fixed by the bolt in a screw hole formed on the stator core through the bolt hole of the bolt fixing part. In particular, the bolt fixing part formed on the main body part is fixed to the end surface of the stator core by the bolt. This can suppress sliding of the coil fixing member on the stator core.

In the coil fixing member as another aspect of the present invention, the screw hole formed on the stator core and the bolt are fixing members to fix the stator core to the electric rotary machine. Each coil fixing member reuses the bolt and the screw hole formed in advance on the electric rotary machine. That is, the screw holes and the bolts are previously used to fix the stator core to the housing of the electric rotary machine. It is thereby possible to fix the coil fixing members on the stator core without forming any additional screw holes and bolts.

In the coil fixing member as another aspect of the present invention, the bolt fixing part is made of metal. This structure makes it hard to deform the bolt fixing part between the stator core and the bolt. As a result, this structure enables the coil fixing member to be tightly fixed onto the stator core and prevents sliding of the coil fixing member on the end surface of the stator core.

In the coil fixing member as another aspect of the present invention, the displacement preventing member has a prevention part and a ring shaped member. The prevention part is projected from the end surface of the stator core and contacted with the main body part at the outside of the diameter direction of the stator core. The ring shaped member is placed at the outer periphery of the stator core. This structure prevents sliding of the main body part of the coil fixing member toward the outside of the diameter direction of the stator core.

In the coil fixing member as another aspect of the present invention, the ring shaped member is a housing for accommodating the stator core. The housing is reused as the ring shaped member. It is thereby possible to fix the coil fixing members to the stator core without preparing and using any additional members.

In the coil fixing member as another aspect of the present invention, the main body part has a part of a character "U" shape in which one slot is accommodated. This structure of the coil fixing member allows the main body part to be placed between the connection parts and the end surface of the stator core even if the extending direction of the connection parts connected to the slot in the part of a character "U" shape is both the inside and outside directions in the radial direction. As a result, this structure of the coil fixing member can suppress any displacement between the stator coil and the stator core.

In the coil fixing member as another aspect of the present invention, the main body part is made of metal covered with an insulation resin. This structure can suppress any displacement of the stator coil when various types of stress such as mechanical stress, heat stress, and vibration are applied to the coil fixing member and those stresses deform the coil fixing member placed between the stator coil and the end surface of the stator core. Still further, because the outer peripheral surface of the main body part is covered with resin, this can maintain electrical insulation between the stator core and the stator coil.

In accordance with another aspect of the present invention, there is provided an electric rotary machine having a rotor, a stator comprised of a stator core and a stator coil, and coil fixing members. The rotor has a plurality of magnetic north and south poles, alternately placed along the circumferential direction thereof. The stator core has a plurality of slots formed on at least one end surface thereof along the circumferential direction. The stator coil has stator windings. Each stator winding has connection parts. Each connection part connects slot accommodation parts together at the outside of the slot. The slot accommodation parts are placed in different slots in the circumferential direction. The coil fixing members are placed between the stator coil and at least one end surface of the stator core in order to suppress a displacement between the stator coil and the stator core. Each coil fixing member has a main body part and a displacement preventing member. The main body part is placed between the connection parts of the stator windings and the end surface of the stator core in order to suppress the displacement between the stator coil and the stator core. The displacement preventing member is capable of preventing the displacement of the main body part to the stator core and the stator coil.

The coil fixing members make it hard to fall away of or release the stator core even if various types of stress such as mechanical stress, heat stress, and vibration are applied to the coil fixing members and those stresses deform the coil fixing members placed between the stator coil and the end surface of the stator core. That is, the electric rotary machine with the coil fixing members has the improved feature to avoid decreasing of the performance caused by falling away of the coil fixing members from the stator core.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A coil fixing member to be placed between a stator coil and at least one axial end surface of a stator core in an electric rotary machine having a rotor with a plurality of magnetic north and south poles alternately placed along a circumferential direction thereof, each coil fixing member suppressing a displacement between the stator core and the stator coil and fixing them together, the stator core having a plurality of slots formed along the circumferential direction of the stator core, each of the slots having a same depth in a diameter direction of the stator core, the slots facing the rotor at the inside or the outside of the stator core, the stator coil comprising stator windings, each stator winding comprising slot accommodation parts and connection parts, each slot accommodation part being placed in a corresponding one of said slots, and slot accommodation parts of the stator windings placed in different slots being connected together on the axial end surface of the stator core through a respective said connection part, each connection part having a step shape, the coil fixing member comprising:

a main body part capable of preventing the displacement of the stator coil from the stator core, and being placed between the axial end surface of the stator core and a flat part of at least one said connection part having the step shape, the flat part of the connection part extending in parallel to the axial end surface of the stator core; and a displacement preventing member capable of preventing the displacement of the main body part of the coil fixing member on the axial end surface of the stator core.

2. The coil fixing member according to claim 1, wherein the displacement preventing member in each coil fixing member is a bolt fixing part having a bolt hole that is assembled together with the main body part, and a bolt inserted through the bolt hole, wherein the coil fixing member is bolted by the bolt via a screw hole formed in the axial end surface of the stator core.

3. The coil fixing member according to claim 2, wherein the screw hole formed in the axial end surface of the stator core and the bolt fix the stator core to the electric rotary machine.

4. The coil fixing member according to claim 3, wherein the bolt fixing part is made of metal.

5. The coil fixing member according to claim 2, wherein the bolt fixing part is made of metal.

6. The coil fixing member according to claim 1, wherein the displacement preventing member comprises:

a ring shaped member placed at the outer periphery of the stator core.

7. The coil fixing member according to claim 6, wherein the ring shaped member is a housing case for accommodating the stator core.

8. The coil fixing member according to claim 7, wherein the main body part has a part of a character "U" shape which corresponds to one slot.

9. The coil fixing member according to claim 7, wherein the main body part is made of metal covered with an insulation resin.

10. The coil fixing member according to claim 6, wherein the ring shaped member is in contact with an entire periphery of the stator core.

11. The coil fixing member according to claim 1, wherein the main body part has a part of a character "U" shape which corresponds to one slot.

12. The coil fixing member according to claim 11, wherein the main body part is made of metal covered with an insulation resin.

13. The coil fixing member according to claim 1, wherein the main body part is made of metal covered with an insulation resin.

14. An electric rotary machine comprising:

a rotor having a plurality of magnetic north and south poles, alternately placed along a circumferential direction thereof;

a stator core having a plurality of axially extending slots formed along the circumferential direction, each of the slots having the same depth in a diameter direction of the stator core, the slots facing to the rotor at the inside or the outside of the stator core;

a stator coil comprising stator windings, each stator winding comprising slot accommodation parts and connection parts, each slot accommodation part being placed in a corresponding one of said slots, and slot accommodation parts of the stator windings placed in different slots being connected together on the axial end surface of the stator core through a respective said connection part, and each connection part having a step shape, a plurality of coil fixing members placed in a gap between the stator coil and at least one axial end surface of the stator core in order to suppress a displacement between the stator coil and the stator core, each coil fixing member comprising:

a main body part capable of preventing the displacement of the stator coil from the stator core, and being placed between the axial end surface of the stator core and a flat part of at least one said connection part having the step shape, the flat part of the connection part extending in parallel to the axial end surface of the stator core; and a displacement preventing member capable of preventing the displacement of the main body part of the coil fixing member on the axial end surface of the stator core.

15. The electric rotary machine according to claim 14, wherein each coil fixing member is comprised of a spacer and a bolt, the spacer comprising said main body part and a bolt fixing part for receiving said bolt as said displacement preventing member, said bolt being threaded to a screw hole formed in the axial end surface of the stator core.

16. The electric rotary machine according to claim 15, wherein the bolt fixing part extends from the main body part in the diameter direction of the stator core.

17. The electric rotary machine according to claim 14, wherein the main body part is comprised of a metal plate and a resin film formed on the outer surface of the metal plate.

18. The electric rotary machine according to claim 14, wherein the main body part is inserted and placed between the stator coil and the stator core so that a surface of the main body part which is on an opposite side of the main body part with respect to the stator core, has a smoothly tapered and rounded shape.

19. The electric rotary machine according to claim 14, wherein the main body part is received between only one said connection part and the axial end surface of the stator core.

20. The electric rotary machine according to claim 14, wherein the main body part is substantially "U" shaped with two legs, each received solely between a respective connection part and the axial end surface of the stator core.

* * * * *